United States Patent
Nakamura et al.

(10) Patent No.: US 10,042,090 B2
(45) Date of Patent: Aug. 7, 2018

(54) HYDROPHILIC MEMBER AND METHOD FOR MANUFACTURING SAME

(71) Applicant: MURAKAMI CORPORATION, Shizuoka (JP)

(72) Inventors: Masatoshi Nakamura, Fujieda (JP); Syungo Ikeno, Fujieda (JP); Shinya Takayanagi, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 276 days.

(21) Appl. No.: 14/442,921

(22) PCT Filed: Oct. 28, 2013

(86) PCT No.: PCT/JP2013/079136
§ 371 (c)(1),
(2) Date: May 14, 2015

(87) PCT Pub. No.: WO2014/080726
PCT Pub. Date: May 30, 2014

(65) Prior Publication Data
US 2015/0293268 A1 Oct. 15, 2015

(30) Foreign Application Priority Data

Nov. 21, 2012 (JP) .................................. 2012-255257

(51) Int. Cl.
*B01J 21/08* (2006.01)
*G02B 1/18* (2015.01)
(Continued)

(52) U.S. Cl.
CPC .............. *G02B 1/18* (2015.01); *B01J 21/063* (2013.01); *B01J 21/08* (2013.01); *B01J 35/004* (2013.01);
(Continued)

(58) Field of Classification Search
None
See application file for complete search history.

(56) References Cited

U.S. PATENT DOCUMENTS 5,854,708 A   12/1998   Komatsu et al.
6,013,372 A   1/2000   Makoto et al.
(Continued)

FOREIGN PATENT DOCUMENTS

CN   1129659 C   12/2003
CN   102582137 A   7/2012
(Continued)

OTHER PUBLICATIONS

English translation of JP2009262049, Nov. 2009.*
(Continued)

*Primary Examiner* — Melvin C. Mayes
*Assistant Examiner* — Stefanie J Cohen
(74) *Attorney, Agent, or Firm* — Greenblum & Bernstein, P.L.C.

(57) ABSTRACT

In a hydrophilic member including a structure in which a photocatalytic $TiO_2$ layer and a porous $SiO_2$ layer are stacked on a surface of a base material, easy forming of the porous $SiO_2$ layer so as to be thin and have a uniform film thickness distribution that enables the porous $SiO_2$ layer to cover an entire surface of the photocatalytic $TiO_2$ layer, and enhancement in durability of the porous $SiO_2$ layer are enabled. A photocatalytic $TiO_2$ layer is formed so as to have a density of 3.33 to 3.75 $g/cm^3$ (preferably 3.47 to 3.72 $g/cm^3$, more preferably 3.54 to 3.68 $g/cm^3$) on a surface of a base material. As an outermost surface layer, a porous $SiO_2$ layer is formed on the photocatalytic $TiO_2$ layer in such a manner that the porous $SiO_2$ layer has a film thickness of no less than 10 nm and no more than 50 nm.

9 Claims, 3 Drawing Sheets

(51) Int. Cl.
 B01J 37/02 (2006.01)
 B01J 21/06 (2006.01)
 B01J 35/00 (2006.01)
 C03C 17/34 (2006.01)
(52) U.S. Cl.
 CPC ....... B01J 35/0026 (2013.01); B01J 37/0238 (2013.01); C03C 17/3417 (2013.01); C03C 2217/425 (2013.01); C03C 2217/71 (2013.01); C03C 2217/75 (2013.01)

(56) References Cited

U.S. PATENT DOCUMENTS

| | | | | |
|---|---|---|---|---|
| 6,447,123 B2* | 9/2002 | Tonar | ................... | B60R 1/0602 359/601 |
| 2001/0030808 A1* | 10/2001 | Komatsu | ............. | C03C 17/3417 359/507 |
| 2008/0038458 A1 | 2/2008 | Zekeriyya et al. | | |

FOREIGN PATENT DOCUMENTS

| | | |
|---|---|---|
| EP | 0978494 A1 | 2/2000 |
| JP | 10-036144 A | 2/1998 |
| JP | 2000-053449 A | 2/2000 |
| JP | 2000-239047 A | 9/2000 |
| JP | 2002-201045 A | 7/2002 |
| JP | 2003-098307 A | 4/2003 |
| JP | 2004-345223 A | 12/2004 |
| JP | 2006-257244 A | 9/2006 |
| JP | 2009262049 A * | 11/2009 |

OTHER PUBLICATIONS

Kim et al, Liquid Injection Atomic Layer Deposition of Crystalline TiO2 Thin Films with a Smooth Morphology from titanium dipivaloylmethanato di-isopropoxide, 2009, Journal of the Electrochemical Society, 156, pp. D296-D300.*
Chinese Office Action issued with respect to application No. 201380060933.3, dated Dec. 14, 2015.
International Search report issued for application No. PCT/JP2013/079136, dated Jan. 28, 2014.
International preliminary report on patentability issued for application No. PCT/JP2013/079136, dated May 26, 2015.

* cited by examiner

RELATIONSHIP BETWEEN TIO2 LAYER DENSITY AND ACID-RESISTANCE

| TIO2 LAYER DENSITY (g/cm3) | OUTER APPEARANCE |
|---|---|
| 3.2 | FADING OCCURRED |
| 3.28 | CERTAIN DEGREE OF FADING OCCURRED |
| 3.33 | NO FADING OCCURRED |
| 3.54 | ↑ |
| 3.75 | ↑ |

# HYDROPHILIC MEMBER AND METHOD FOR MANUFACTURING SAME

The disclosure of Japanese Patent Application No. JP2012-255257 filed on Nov. 21, 2012 including the specification, drawings, claims and abstract is incorporated herein by reference in its entirety.

TECHNICAL FIELD

The present invention relates to a hydrophilic member including a structure in which a $TiO_2$ (photocatalytic $TiO_2$) layer that provides photocatalysis and a porous $SiO_2$ layer are stacked on a surface of a base material, and a method for manufacturing the same. In particular, the present invention enables easy forming of the porous $SiO_2$ layer that is thin and has a uniform film thickness distribution that enables the porous $SiO_2$ layer to cover an entire surface of the photocatalytic $TiO_2$ layer, and enhancement in durability of the porous $SiO_2$ layer.

BACKGROUND ART

Examples of a hydrophilic member including a structure in which a photocatalytic $TiO_2$ layer and a porous $SiO_2$ layer are stacked on a surface of a base material are described in Patent Literatures 1 and 2. The hydrophilic member described in each of Patent Literatures 1 and 2 is one that ensures hydrophilicity by means of the porous $SiO_2$ layer at an outermost surface, decomposes organic matter and the like adhered to the porous $SiO_2$ layer by means of photocatalysis provided by the photocatalytic $TiO_2$ layer below the porous $SiO_2$ layer, and thereby enables hydrophilicity of the porous $SiO_2$ layer to be maintained for a long period of time.

CITATION LIST

Patent Literature

Patent Literature 1: Japanese Patent Laid-Open No. 10-36144
Patent Literature 2: Japanese Patent Laid-Open No. 2000-53449

SUMMARY OF INVENTION

Technical Problem

In a hydrophilic member including the aforementioned structure, in order to ensure uniform (that is, no irregularity through all regions of a hydrophilic surface of the hydrophilic member) and preferable hydrophilicity in every part of the hydrophilic surface, it is necessary to form a porous $SiO_2$ layer that is thin and has a uniform film thickness distribution that enables the porous $SiO_2$ layer to cover an entire surface of a photocatalytic $TiO_2$ layer when the film thickness of the porous $SiO_2$ layer is no more than 50 nm (preferably no more than 20 nm). However, it is not easy to form a porous $SiO_2$ layer that is thin and has a uniform film thickness distribution on a photocatalytic $TiO_2$ layer. In other words, in order to form a porous $SiO_2$ layer on a photocatalytic $TiO_2$ layer by means of, for example, vapor deposition, it is necessary to vapor-deposit $SiO_2$ with an increased gas pressure (partial pressure of oxygen gas) in a vapor deposition atmosphere compared to that for cases where a non-porous vapor-deposited $SiO_2$ layer is formed. However, vapor deposition with an increased gas pressure in a vapor deposition atmosphere causes instability in flight of $SiO_2$ vapor deposition molecules. Thus, irregularity in film thickness distribution occurs in some regions of the hydrophilic surface, resulting in the photocatalytic $TiO_2$ layer being partially exposed. Therefore, conventionally, in order to form an $SiO_2$ layer having a uniform film thickness distribution, some ingenuity (e.g., in arrangement of a correction plate and/or limiting the number of members to be subjected to the film forming process at a time) in the film forming process is required.

The present invention is intended to solve the aforementioned problems. In other words, the present invention is intended to provide a hydrophilic member and a method for manufacturing the same that enable easy forming of a porous $SiO_2$ layer that is thin and has a uniform film thickness distribution that enables the porous $SiO_2$ layer to cover an entire surface of a photocatalytic $TiO_2$ layer, thereby preventing the photocatalytic $TiO_2$ layer from being partially exposed, and enhancement in durability of the porous $SiO_2$ layer.

Solution to Problem

FIG. 2 indicates results of a test for measuring hydrophilicity recovery time of a hydrophilic member. The hydrophilic member used in this test is one formed by forming a photocatalytic $TiO_2$ layer on a surface of a flat and smooth base material and forming an $SiO_2$ layer having a film thickness of no more than 50 nm obtained by vapor-depositing $SiO_2$ vapor deposition molecules on the photocatalytic $TiO_2$ layer with a low gas pressure that enables stable flight of the $SiO_2$ vapor deposition molecules. Samples of the hydrophilic member with respective photocatalytic $TiO_2$ layers having different densities were prepared, and for each sample, time from a state in which hydrophilicity had been lost due to adherence of organic matter to a surface thereof to recovery of hydrophilicity due to ultraviolet irradiation (hydrophilicity recovery time) was measured. In this test, a surface of the $SiO_2$ layer of each sample was contaminated by an oil to lose hydrophilicity of the surface, and then, the surface is irradiated with an ultraviolet ray having an intensity of 1 $mW/cm^2$ using a black light. Recovery of hydrophilicity was determined when a water droplet contact angle was decreased to be comparable to an initial value before the contamination (no more than five degrees). Also, whether or not $SiO_2$ vapor deposition molecules stably fly during preparation of the samples can be determined based on, for example, whether or not a current (emission current) value of an electron beam or a vapor deposition speed during vapor deposition is stable. In this case, the vapor deposition speed can be measured as, for example, a derivative value of an oscillation frequency of a quartz-crystal film thickness meter. Also, the density of the photocatalytic $TiO_2$ layer of each sample can be adjusted by film forming conditions (e.g., a temperature of the base material, the film forming speed and/or the gas pressure), and the density can be measured by means of, for example, grazing incidence X-ray diffractometry. As can be seen from FIG. 2, as the density of the photocatalytic $TiO_2$ layer is lower, the hydrophilicity recovery time is shorter, and where the density exceeds 3.68 $g/cm^3$, the hydrophilicity recovery time drastically increases, and where the density exceeds 3.75 $g/cm^3$, the hydrophilicity recovery time becomes too long, the photocatalytic $TiO_2$ layer becomes impracticable. The hydrophilicity recovery time being short means that photocatalysis provided by the photocatalytic TiO$_2$ layer easily reaches the surface of the SiO$_2$ layer because the SiO$_2$ layer is porous. The hydrophilicity recovery time being long means that it is hard for photocatalysis provided by the photocatalytic TiO$_2$ layer to reach the surface of the SiO$_2$ layer because the SiO$_2$ layer is nonporous. The results of this test indicate that forming a photocatalytic TiO$_2$ layer so as to have a density of no more than 3.75 g/cm$^3$ (preferably no more than 3.72 g/cm$^3$, more preferably no more than 3.68 g/cm$^3$) that is lower than 3.90 g/cm$^3$, which is a typical density of anatase crystal structures, enables forming of a porous SiO$_2$ layer even if SiO$_2$ vapor deposition molecules is vapor-deposited on the photocatalytic TiO$_2$ layer with a low gas pressure that enables stable flight of the SiO$_2$ vapor deposition molecules. Since the vapor-deposition can be performed with a low gas pressure, a porous SiO$_2$ layer that is thin and has a uniform film thickness distribution can easily be formed with no special ingenuity in the film forming process. The test conducted by the present inventors indicates that where a photocatalytic TiO$_2$ layer having a density of no more than 3.75 g/cm$^3$ is formed and SiO$_2$ vapor deposition molecules are vapor-deposited on the photocatalytic TiO$_2$ layer with a low gas pressure that enables stably flight of the SiO$_2$ vapor deposition molecules, a porous SiO$_2$ layer is formed. Also, if the porous SiO$_2$ layer has a thickness of no less than 10 nm, an entire surface of the photocatalytic TiO$_2$ layer can be covered by the porous SiO$_2$ layer (that is, partial exposure of the photocatalytic TiO$_2$ layer can be prevented).

FIG. 3 indicates results of a test in which for each of samples that are similar to those used in the test in FIG. 2 (samples of a hydrophilic member formed by forming a photocatalytic TiO$_2$ layer on a surface of a flat and smooth base material and forming an SiO$_2$ layer having a film thickness of no more than 50 nm obtained by vapor-depositing SiO$_2$ vapor deposition molecules on the photocatalytic TiO$_2$ layer with a low gas pressure that enables stable flight of the SiO$_2$ vapor deposition molecules, the samples including respective photocatalytic TiO$_2$ layers having different densities), a scratching load for the SiO$_2$ layer was measured. This test was conducted according to a procedure that is similar to that of a pencil hardness test, using an iron rod instead of a pencil, by measuring a load with each of weights having different weights employed. FIG. 3 indicates that as the density of the photocatalytic TiO$_2$ layer is lower, the SiO$_2$ layer formed on the photocatalytic TiO$_2$ layer is more brittle, and as the density of the photocatalytic TiO$_2$ layer is higher, the SiO$_2$ layer is harder.

FIG. 4 indicates results of a test in which for each of samples that are similar to those used in each of the tests in FIGS. 2 and 3, an acid-resistance of the SiO$_2$ layer was measured. This test was conducted by dropping H$_2$SO$_4$ having a concentration that is a normality of 0.1N on a surface of the SiO$_2$ layer and observing the state of the surface after being left for 24 hours. In this test, where the density of the photocatalytic TiO$_2$ layer is less than 3.33 g/cm$^3$, a color of a part on which H$_2$SO$_4$ was dropped was more faded compared to a color of a part surrounding that part. This is because the base material was exposed as a result of the SiO$_2$ layer and the photocatalytic TiO$_2$ layer being stripped off at that part, resulting in no interference color generated by the SiO$_2$ layer and the photocatalytic TiO$_2$ layer. On the other hand, where the density of the photocatalytic TiO$_2$ layer is no less than 3.33 g/cm$^3$, at the part on which H$_2$SO$_4$ was dropped, no fading occurred and the SiO$_2$ layer and the photocatalytic TiO$_2$ layer were not stripped off. Therefore, the test results in FIG. 4 indicate that where the density of the photocatalytic TiO$_2$ layer is less than 3.33 g/cm$^3$, the acid-resistance is low and if the density of the photocatalytic TiO$_2$ layer is no less than 3.33 g/cm$^3$, the acid-resistance is high.

The test results in FIGS. 3 and 4 indicate that forming a photocatalytic TiO$_2$ layer having a density of no less than 3.33 g/cm$^3$ (preferably no less than 3.47 g/cm$^3$, more preferably no less than 3.54 g/cm$^3$) enables provision of a practical durability (scratch resistance and acid resistance).

Accordingly, the results of the tests in FIGS. 2 to 4 indicate that forming a photocatalytic TiO$_2$ layer having a density of 3.33 to 3.75 g/cm$^3$ (preferably 3.47 to 3.72 g/cm$^3$, more preferably 3.54 to 3.68 g/cm$^3$) enables easy forming of a porous SiO$_2$ layer that is thin and has a uniform film thickness distribution that enables the porous SiO$_2$ layer to cover an entire surface of the photocatalytic TiO$_2$ layer and enhancement in durability of the porous SiO$_2$ layer.

Therefore, in the present invention, a photocatalytic TiO$_2$ layer having a density of 3.33 to 3.75 g/cm$^3$ (preferably 3.47 to 3.72 g/cm$^3$, more preferably 3.54 to 3.68 g/cm$^3$) is formed on a surface of a base material and, as an outermost surface layer, a porous SiO$_2$ layer having a film thickness of no less than 10 nm and no more than 50 nm (preferably no less than 15 nm and no more than 20 nm) is formed on the TiO$_2$ layer in such a manner that the porous SiO$_2$ layer covers an entire surface of the TiO$_2$ layer. Consequently, a thin porous SiO$_2$ layer can be formed on a photocatalytic TiO$_2$ layer and can also be formed so as to have a uniform film thickness distribution that enables the porous SiO$_2$ layer to cover an entire surface of the photocatalytic TiO$_2$ layer, enabling provision of favorable and uniform photocatalysis by the photocatalytic TiO$_2$ layer. Also, the durability of the porous SiO$_2$ layer can be enhanced.

DESCRIPTION OF EMBODIMENT

Figure 1:
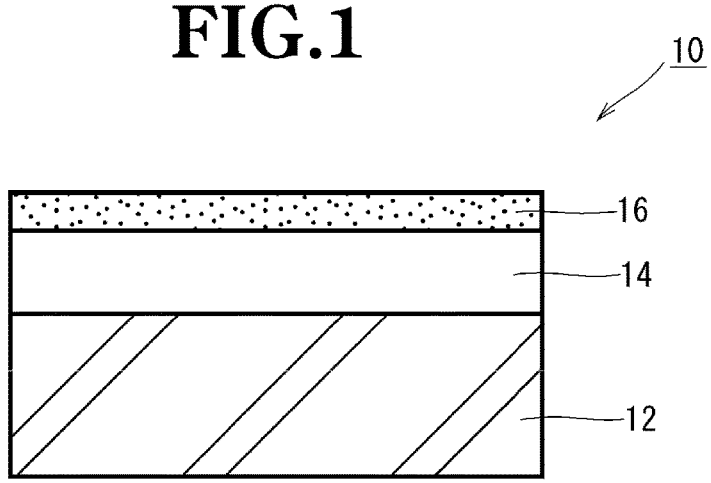
FIG. 1 is a schematic cross-sectional diagram illustrating an embodiment of a hydrophilic member of the present invention.
Figure 2:
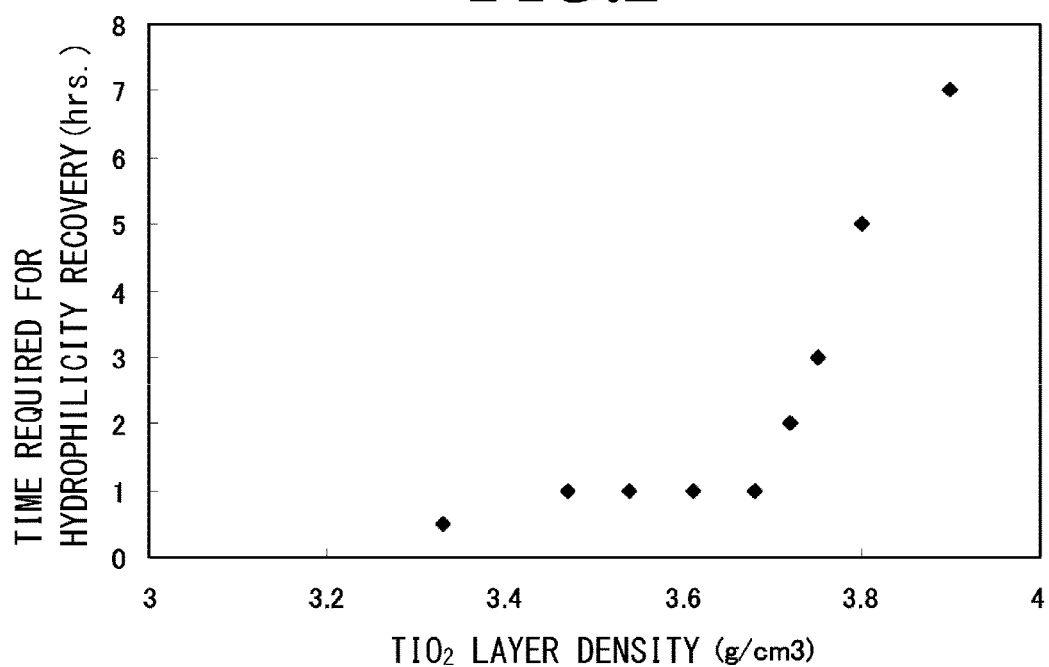
FIG. 2 is a diagram indicating results of a test in which for each of samples of a hydrophilic member (samples of a hydrophilic member formed by forming a photocatalytic TiO$_2$ layer on a surface of a flat and smooth base material and forming an SiO$_2$ layer having a film thickness of no more than 50 nm obtained by vapor-depositing SiO$_2$ vapor deposition molecules on the photocatalytic TiO$_2$ layer with a low gas pressure that enables stable flight of the SiO$_2$ vapor deposition molecules, the samples including respective photocatalytic TiO$_2$ layers having different densities), time from a state in which hydrophilicity had been lost due to adherence of organic matter to a surface thereof to recovery of hydrophilicity due to ultraviolet irradiation was measured.
Figures 3, 4:
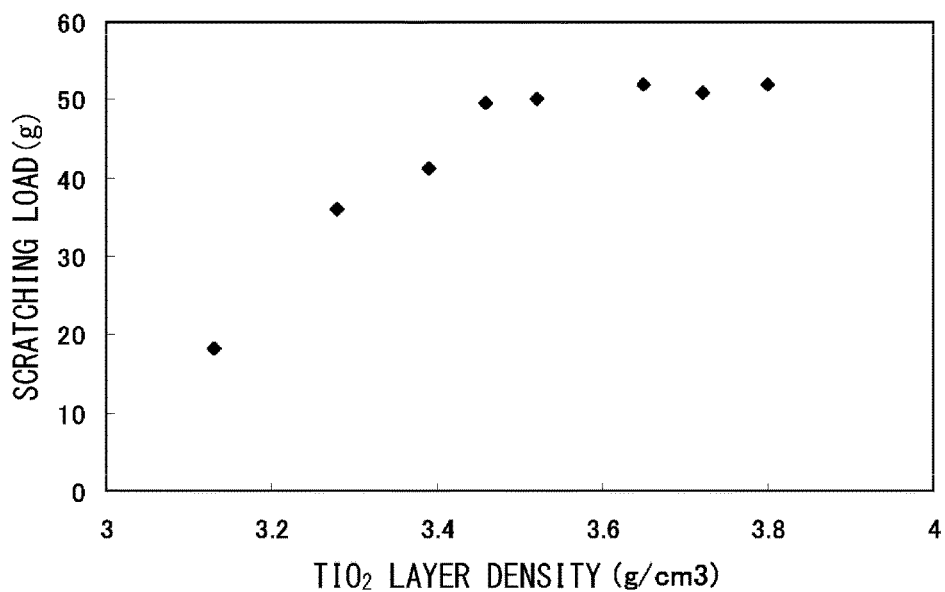
FIG. 3 is a diagram indicating results of a test in which for each of samples that are similar to those used in the test in FIG. 2, a scratching load for the SiO$_2$ layer was measured.
FIG. 4 is a chart indicating results of a test in which for each of samples that are similar to those used in each of the tests in FIGS. 2 and 3, an acid-resistance of the SiO$_2$ layer was measured.

FIG. 1 is a schematic cross-sectional diagram of an embodiment of a hydrophilic member of the present invention. A hydrophilic member 10 is configured by forming a photocatalytic $TiO_2$ layer 14 on a flat and smooth surface of a base material 12 and, as an outermost surface layer, forming a porous $SiO_2$ layer 16 on the photocatalytic $TiO_2$ layer 14. The porous $SiO_2$ layer 16 is formed so as to have a uniform film thickness distribution that enables the porous $SiO_2$ layer 16 to cover an entire surface of the photocatalytic $TiO_2$ layer. A density of the photocatalytic $TiO_2$ layer 14 is 3.33 to 3.75 g/cm$^3$ (preferably 3.47 to 3.72 g/cm$^3$, more preferably 3.54 to 3.68 g/cm$^3$). A film thickness of the photocatalytic $TiO_2$ layer 14 is 50 to 500 nm. A film thickness of the porous $SiO_2$ layer 16 is no less than 10 nm and no more than 50 nm (preferably no less than 15 nm and no more than 25 nm).

The hydrophilic member 10 enables provision of, for example, an automobile window, or building window glass by forming the base material 12 using a transparent glass plate or a transparent resin plate. Also, the hydrophilic member 10 enables provision of, for example, a back surface mirror-type outer mirror for a vehicle or a back surface mirror such as a bathroom mirror by forming the base material 12 using a transparent glass plate or a transparent resin plate and forming a reflective film on a back surface of the base material 12. Also, the hydrophilic member 10 enables provision of, for example, a front surface mirror such as a front surface mirror-type outer mirror for an automobile by forming the base material 12 using a glass plate or a resin plate and forming a reflective film between the base material 12 and the photocatalytic $TiO_2$ layer 14. Also, the hydrophilic member 10 enables provision of a fog-resistant optical element by forming the base material 12 using an optical element such as a lens. If the base material 12 is a glass plate, a block layer (barrier layer) of, e.g., $SiO_2$ can additionally be arranged between the base material 12 and the photocatalytic $TiO_2$ layer 14 in order to prevent diffusion of alkali ions in the base material 12 into the photocatalytic $TiO_2$ layer 14.

An example of a method for manufacturing the hydrophilic member 10 in FIG. 1 will be described. Here, the base material 12 is formed using a glass plate, and each of the photocatalytic $TiO_2$ layer 14 and the porous $SiO_2$ layer 16 is formed by means of vapor deposition.

Figure 5:
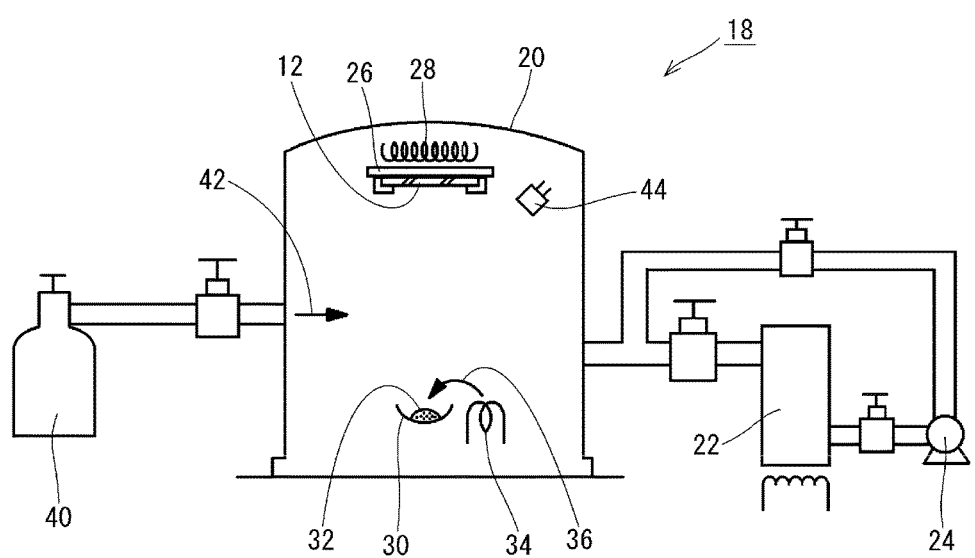
FIG. 5 is a schematic diagram illustrating an example of a vacuum vapor deposition apparatus 18 for manufacturing the hydrophilic member 10 in FIG. 1.

FIG. 5 illustrates an example of a vacuum vapor deposition apparatus 18. A vacuum chamber 20 is evacuated by a diffusion pump 22 and a rotary pump 24. In an upper portion of the vacuum chamber 20, a substrate holder 26 is arranged, and a glass plate 12, which forms a base material for the hydrophilic member 10, is held by the substrate holder 26, with a film-forming surface directed downward. The substrate holder 26 is heated by a heater 28 and the glass plate 12 is kept at a desired temperature via the substrate holder 26. A crucible 30 is arranged at a position below the glass plate 12, and a vapor deposition material (starting substance for vapor deposition) 32 is placed in the crucible 30. Examples of the vapor deposition material 32 for forming a $TiO_2$ layer 14 include, e.g., $TiO_2$, $Ti_2O_3$ and Ti. Examples of the vapor deposition material 32 for forming an $SiO_2$ layer 16 include, e.g., $SiO_2$ and SiO.

The vapor deposition material 32 is evaporated as a result of being irradiated with an electron beam 36 emitted from a hot cathode 34. As a reactive gas, an oxygen gas 42 is introduced from an oxygen tank 40 into the vacuum chamber 20. The evaporated vapor deposition material 32 reacts with the oxygen gas 42 to produce $TiO_2$ or $SiO_2$. The produced $TiO_2$ or $SiO_2$ is deposited on a surface of the glass plate 12, whereby a $TiO_2$ layer 14 or an $SiO_2$ layer 16 is formed. A film thickness during the film forming is monitored by a film thickness monitoring apparatus 44, and the vapor deposition is stopped when a desired film thickness is reached.

Film properties of the vapor-deposited film vary depending on, e.g., the temperature of the glass plate 12, the vapor deposition speed and the partial pressure of the oxygen gas 42 in the vacuum chamber 20. An example of film forming conditions for forming a photocatalytic $TiO_2$ layer having a density of 3.33 to 3.75 g/cm$^3$ and forming a porous $SiO_2$ layer 16 on the photocatalytic $TiO_2$ layer 14 having a uniform film thickness distribution that enables the $SiO_2$ layer 16 to cover an entire surface of the photocatalytic $TiO_2$ layer if the film thickness of the porous $SiO_2$ layer 16 is no less than 10 nm is indicated in the following table.

|  | Photocatalytic $TiO_2$ layer 14 | Porous $SiO_2$ layer 16 |
| --- | --- | --- |
| Temperature of glass plate 12 | 300 degrees centigrade | 300 degrees centigrade |
| Vapor deposition speed | 0.5 nm/sec. | 0.2 nm/sec. |
| Partial pressure of oxygen gas 42 | 0.016 Pa | 0.016 Pa |

An example of a procedure for forming a photocatalytic $TiO_2$ layer 14 and a porous $SiO_2$ layer 16 using the vacuum vapor deposition apparatus 18 in FIG. 5 will be described below. A photocatalytic $TiO_2$ layer 14 is formed, for example, according to the following procedure.

(1) Hold a glass plate 12 in the substrate holder 26, place, for example, $Ti_2O_3$ as a vapor deposition material 32 in the crucible 30, and close the vacuum chamber 20.
(2) Drive the rotary pump 24 and the diffusion pump 22 to evacuate the vacuum chamber 20.
(3) Drive the heater 28 to heat the glass plate 12 to a predetermined temperature through the substrate holder 26.
(4) Introduce an oxygen gas 42 from the oxygen tank 40 into the vacuum chamber 20.
(5) Drive the hot cathode 34 to irradiate the $Ti_2O_3$, which is a vapor deposition material 32, with an electron beam 36 to evaporate the $Ti_2O_3$.
(6) The evaporated $Ti_2O_3$ reacts with the oxygen gas 42 to produce $TiO_2$. The produced $TiO_2$ is deposited on the glass plate 12, whereby a $TiO_2$ film is formed.
(7) End the film forming when approximately 100 nm of $TiO_2$ is deposited.

Upon the end of the forming of the photocatalytic $TiO_2$ layer 14, subsequently, a porous $SiO_2$ layer 16 is formed. A porous $SiO_2$ layer 16 is formed, for example, according to the following procedure.

(1) Place, for example, $SiO_2$ as a vapor deposition material 32 in the crucible 30 and close the vacuum chamber 20.
(2) Drive the rotary pump 24 and the diffusion pump 22 to evacuate the vacuum chamber 20.
(3) Drive the heater 28 to heat the glass plate 12 to a desired temperature through the substrate holder 26.
(4) Introduce an oxygen gas 42 from the oxygen tank 40 to the vacuum chamber 20.
(5) Drive the hot cathode 34 to irradiate the $SiO_2$, which is a vapor deposition material 32, with an electron beam 36 to evaporate the $SiO_2$.
(6) The evaporated $SiO_2$ is deposited on the photocatalytic $TiO_2$ layer 14 on the glass plate 12, whereby a $SiO_2$ film is formed.

(7) End the film forming when approximately 15 nm of $SiO_2$ is deposited.

Since an outermost surface of the hydrophilic member 10 produced by the above process include the porous $SiO_2$ layer 16 alone, the hydrophilic member 10 exerts excellent effects in surface hardness and hydrophilicity maintenance compared to cases where the outermost surface includes a photocatalytic $TiO_2$ layer alone or a layer of a mixture of photocatalytic $TiO_2$ and $SiO_2$.

Although the above embodiment has been described in terms of a case where a photocatalytic $TiO_2$ layer and a porous $SiO_2$ layer are formed by means of vapor deposition, it can be considered that the effects of the invention according to the present application can also be expected where both or one of the layers is formed by means of another thin film forming method (for example, sputtering).

The invention claimed is:

1. A hydrophilic member comprising a structure in which a layer consisting of $TiO_2$ and having an anatase crystal structure and providing photocatalysis is formed so as to have a density of 3.33 to 3.75 $g/cm^3$ on a surface of a base material, and a porous $SiO_2$ layer is formed as an outermost surface layer on the $TiO_2$ layer in such a manner that the porous $SiO_2$ layer has a thickness of no less than 10 nm and no more than 50 nm and covers an entire surface of the $TiO_2$ layer.

2. The hydrophilic member according to claim 1, wherein the density of the $TiO_2$ layer is 3.47 to 3.72 $g/cm^3$.

3. The hydrophilic member according to claim 2, wherein the density of the $TiO_2$ layer is 3.54 to 3.68 $g/cm^3$.

4. The hydrophilic member according to claim 1, wherein the film thickness of the porous $SiO_2$ layer is no less than 15 nm and no more than 20 nm.

5. The hydrophilic member according to claim 2, wherein the film thickness of the porous $SiO_2$ layer is no less than 15 nm and no more than 20 nm.

6. The hydrophilic member according to claim 3, wherein the film thickness of the porous $SiO_2$ layer is no less than 15 nm and no more than 20 nm.

7. A hydrophilic member manufacturing method comprising the steps of:
    forming a layer consisting of $TiO_2$ that provides photocatalysis, so as to have a density of 3.33 to 3.75 $g/cm^3$ on a surface of a base material; and
    forming a porous $SiO_2$ layer as an outermost surface layer on the $TiO_2$ layer in such a manner that the porous $SiO_2$ layer has a thickness of no less than 10 nm and no more than 50 nm and covers an entire surface of the $TiO_2$ layer.

8. The hydrophilic layer of claim 1, wherein the density of the $TiO_2$ layer is 3.33 to 3.54 $g/cm^3$.

9. A hydrophilic member comprising a structure in which a layer consisting of $TiO_2$ that provides photocatalysis is formed so as to have a density of 3.33 to 3.54 $g/cm^3$ on a surface of a base material, and a porous $SiO_2$ layer is formed as an outermost surface layer on the $TiO_2$ layer in such a manner that the porous $SiO_2$ layer has a thickness of no less than 10 nm and no more than 50 nm and covers an entire surface of the $TiO_2$ layer.

* * * * *